(12) United States Patent
Hsu et al.

(10) Patent No.: US 12,111,503 B2
(45) Date of Patent: Oct. 8, 2024

(54) FIBER OPTIC CONNECTOR

(71) Applicants: Gloriole Electroptic Technology Corp., Kaohsiung (TW); Shen Zhen Wonderwin Technology Co., Ltd., Shenzhen (CN)

(72) Inventors: Hsien-Hsin Hsu, Kaohsiung (TW); Yen-Chang Lee, Kaohsiung (TW); Ke Xue Ning, Shenzhen (CN)

(73) Assignees: Gloriole Electroptic Technology Corp., Kaohsiung (TW); Shen Zhen Wonderwin Technology Co., Ltd., Shenzhen (CN)

( * ) Notice: Subject to any disclaimer, the term of this patent is extended or adjusted under 35 U.S.C. 154(b) by 330 days.

(21) Appl. No.: 17/725,194

(22) Filed: Apr. 20, 2022

(65) Prior Publication Data
US 2023/0139646 A1 May 4, 2023

(30) Foreign Application Priority Data
Oct. 28, 2021 (TW) .................................. 110212697

(51) Int. Cl.
*G02B 6/38* (2006.01)

(52) U.S. Cl.
CPC ....... *G02B 6/38875* (2021.05); *G02B 6/3831* (2013.01)

(58) Field of Classification Search
CPC ..... G02B 6/38; G02B 6/38875; G02B 6/3831
See application file for complete search history.

(56) References Cited

U.S. PATENT DOCUMENTS

2020/0271870 A1* 8/2020 Jibiki ................... G02B 6/3898
2020/0341201 A1* 10/2020 Leigh ................. G06K 7/10237

* cited by examiner

*Primary Examiner* — Tina M Wong
(74) *Attorney, Agent, or Firm* — Blank Rome LLP

(57) ABSTRACT

The fiber optic connector includes a connector head module, a mounting seat, a rear boot, an engaging module and a sheath member. The mounting seat is mounted to a rear end of the connector head module, and includes an external threaded portion. The rear boot is connected to a rear end of the mounting seat. The engaging module is removably coupled to the connector head module. The sheath member includes an internal threaded portion that is formed in an inner surface of the sheath member. When the engaging module is removed from the connector head module, the sheath member can be attachable to the mounting seat with the external threaded portion being threadedly engaged with the external threaded portion of the mounting seat.

7 Claims, 7 Drawing Sheets

FIBER OPTIC CONNECTOR

CROSS-REFERENCE TO RELATED APPLICATION

This application claims priority to Taiwanese Utility Model Patent Application No. 110212697, filed on Oct. 28, 2021.

FIELD

The disclosure relates to a connector, more particularly to a fiber optic connector including a sheath member.

BACKGROUND

Referring to FIG. 1, a conventional fiber optic connector 1 is a device for connecting a fiber optic cable to a fiber optic adapter, and usually has a socketed design. That is, the conventional fiber optic connector 1 has a housing 11 including a latch 12 and an accessory 13 that can be fastened to the socket (port) of the fiber optic adapter. A fiber optic technician may connect the conventional fiber optic connector 1 to the fiber optic adapter so that various devices may be connected in a fiber optic network. When installing conventional fiber optic connectors 1 in a complex environment or when installing fiber optic cables over long distances, the fiber optic technician will very often need to pass the conventional fiber optic connector 1 through a narrow gap or tunnel. At this point, the latch 12 and the accessory 13 that protrude from the conventional fiber optic connecter 1 and that were originally designed as a mechanism for the technician to press, may entangle other wires or catch unto other devices, and since they are protruded, they will have difficulty passing through narrow gaps. This can make it difficult for the technician when installing fiber optic networks and could result in the latch 12 or the accessory 13 breaking off or becoming damaged.

SUMMARY

Therefore, an object of the disclosure is to provide a fiber optic connector that can alleviate at least one of the drawbacks of the prior art.

Accordingly, the fiber optic connector includes a connector head module, a mounting seat, a rear boot, an engaging module and a sheath member. The mounting seat is mounted to a rear end of the connector head module, and includes a seat body portion, and an external threaded portion that protrudes from the seat body portion. The rear boot is connected to a rear end of the seat body portion. The engaging module is removably coupled to the connector head module. The sheath member includes a sheath portion and an internal threaded portion that is formed in an inner surface of the sheath member. When the engaging module is removed from the connector head module, the sheath member is attachable to the mounting seat with the sheath portion sleeved on the connector head module and with the internal threaded portion threadedly engaged with the external threaded portion of the mounting seat.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
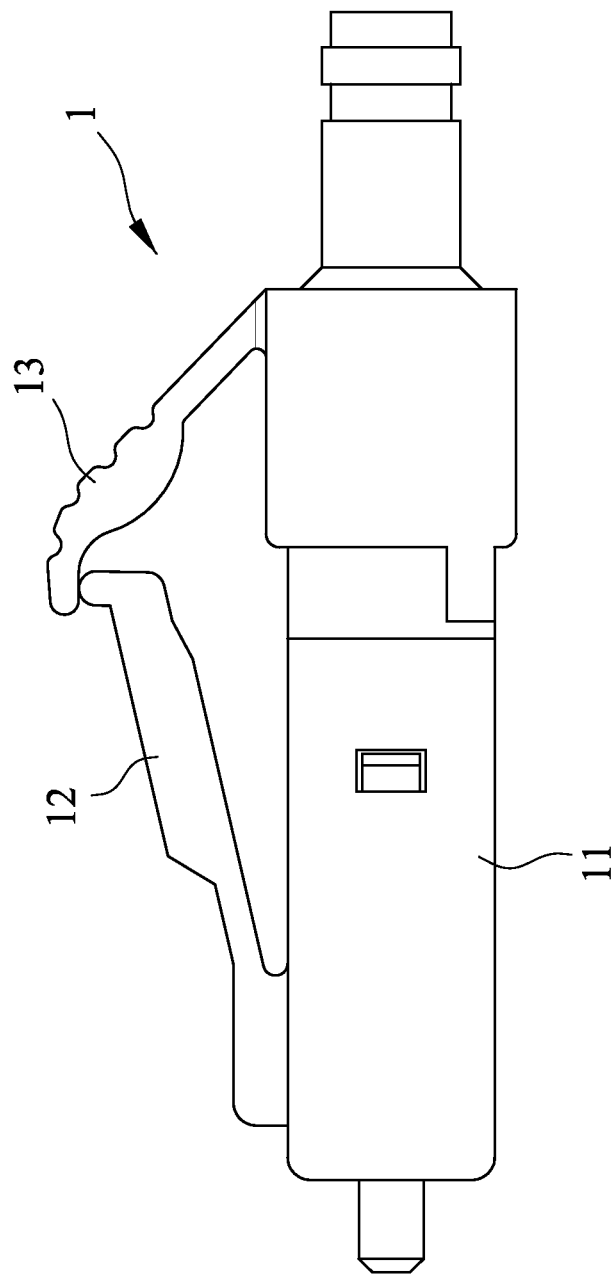
FIG. 1 is a side view of a conventional fiber optic connector.
Figure 2:
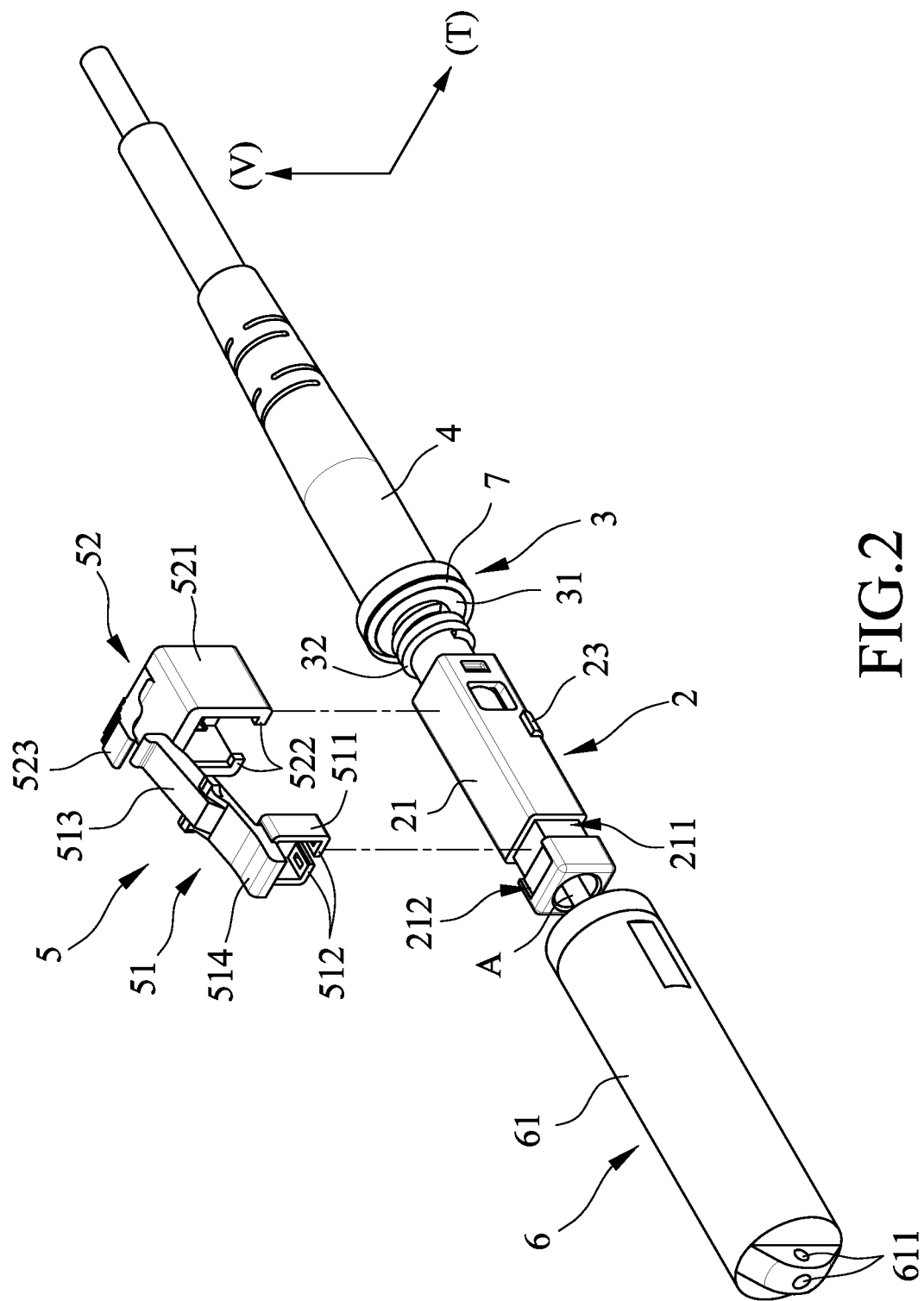
FIG. 2 is a partly exploded perspective view of an embodiment of a fiber optic connector according to the present disclosure.

Referring to FIG. 2, an embodiment of a fiber optic connector according to the present disclosure includes a connector head module 2, a mounting seat 3 mounted to a rear end of the connector head module 2, a rear boot 4 connected to a rear end of the mounting seat 3, an engaging module 5 removably coupled to the connector head module 2, a sheath member 6, and an annular seal 7 sleeved on the mounting seat 3.

Figure 3:
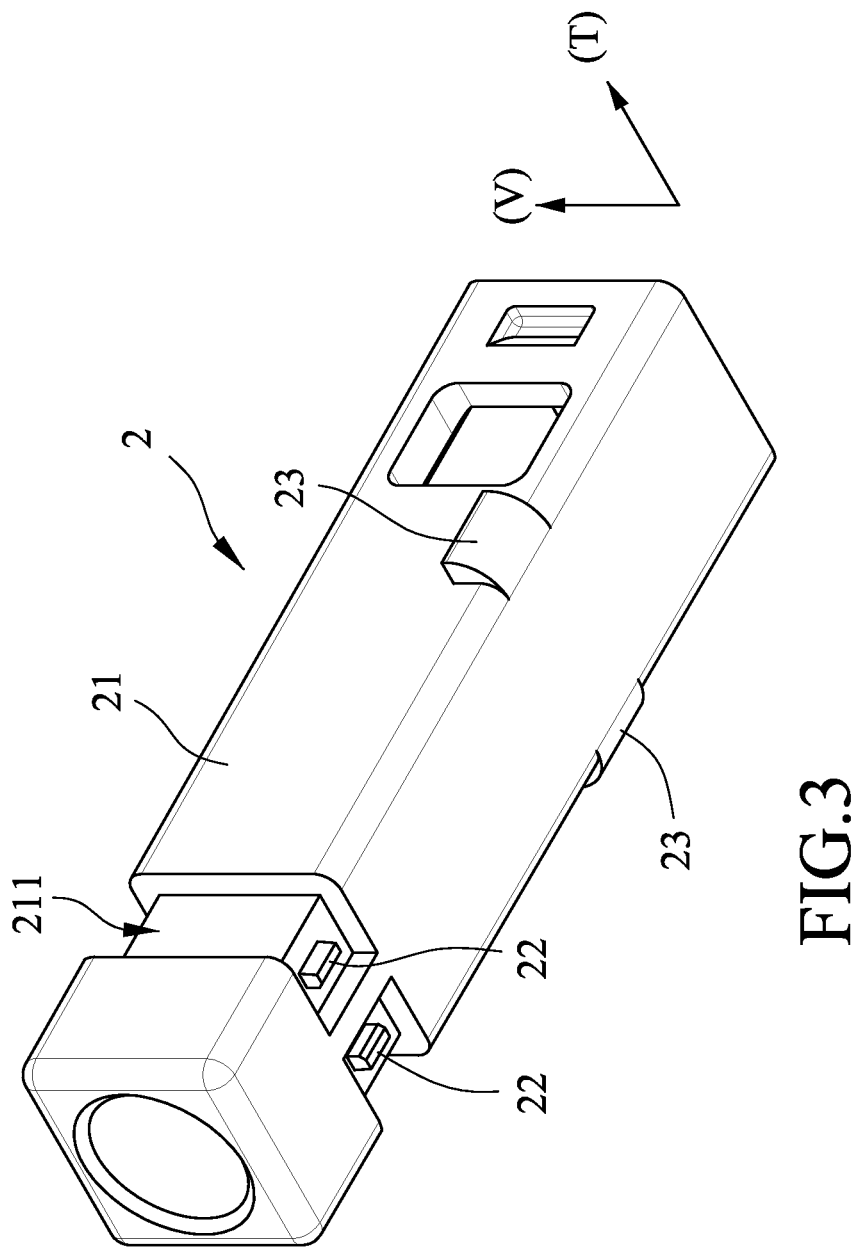
FIG. 3 is a perspective view of a connector head module of the embodiment.

Referring to FIGS. 2 and 3, the connector head module 2 includes a shell body portion 21 that is formed with a neck groove 211, two snap-lock portions 22 that protrude downwardly from a bottom of the shell body portion 21, that are spaced apart in a left-right direction (T), and that are disposed in the neck groove 211, and two blocking portions 23 that respectively protrude from opposite lateral sides (i.e., left and right sides) of the shell body portion 21 and that are located rearwardly of the snap-lock portions 22. The shell body portion 21 is also provided with an optical fiber core (A) and a fiber optic cable as needed for the fiber optic connector to function. However, these components are not the focus of the present disclosure, and are not further described herein. In this embodiment, the neck groove 211 is substantially an inverted U-shaped trough, and has two ends that are formed in the bottom the shell body portion 21 but not connected to each other (the neck groove 211 does not fully encircle the shell body portion 21). The shell body portion 21 is further formed with a positioning groove 212 that is adjacent to the neck groove 211 and that is located in front of the neck groove 211. The mounting seat 3 includes a seat body portion 31 that is inserted into a rear end of the shell body portion 21, and an external threaded portion 32 that protrudes from the seat body portion 31. The rear boot 4 is connected to a rear end of the seat body portion 31 to be fixed thereon.

Figure 4:
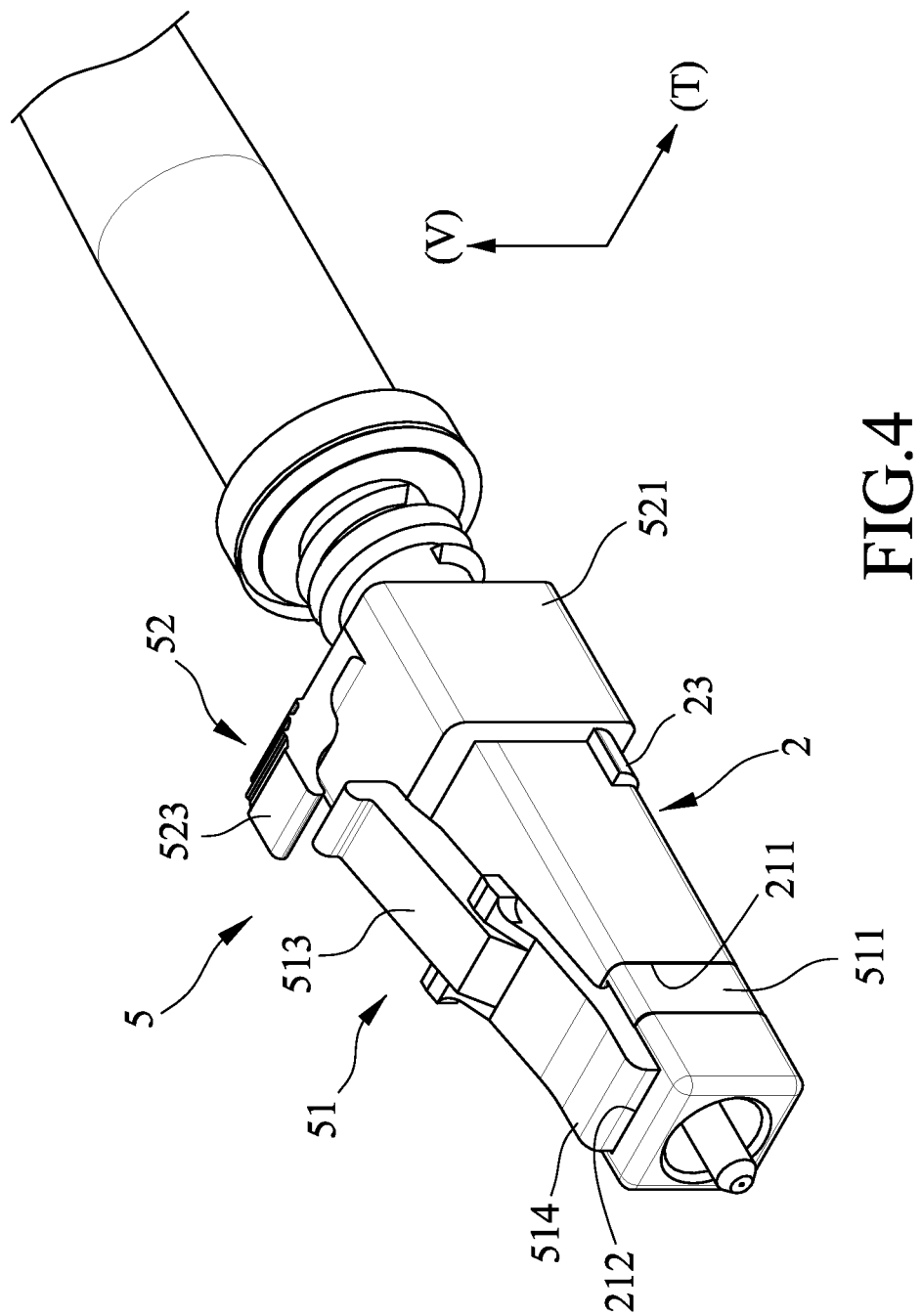
FIG. 4 is a fragmentary perspective view, illustrating a configuration of an engaging module coupled to the connector head module.
Figure 5:
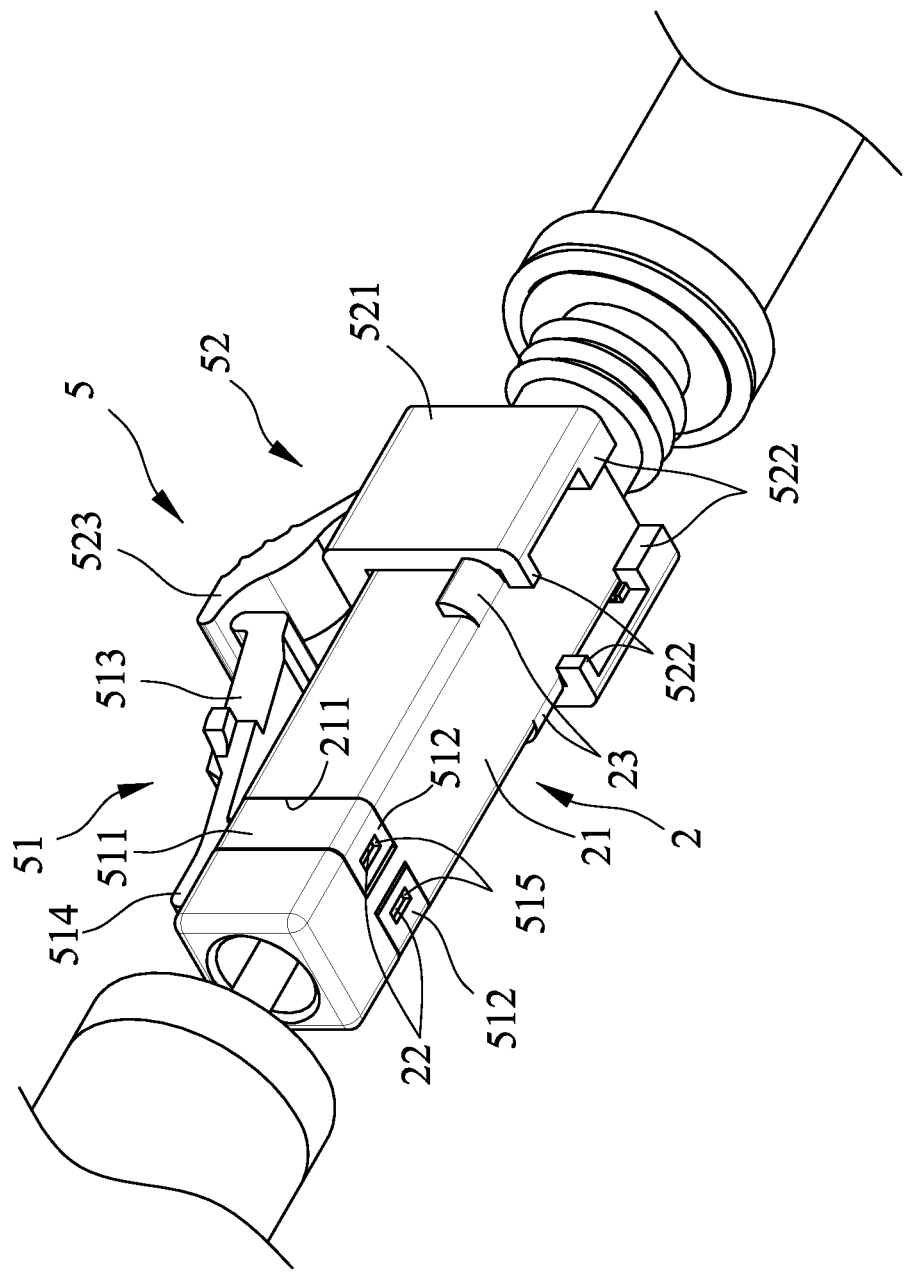
FIG. 5 is a fragmentary perspective view of the embodiment taken from another angle.

Referring to FIGS. 2, 4, and 5, the engaging module 5 includes a support member 51 that is removably engaged to the shell body portion 21 of the connector head module 2, and a press member 52 that is removably engaged to the shell body portion 21 of the connector head module 2 and that is located rearwardly of the support member 51. The support member 51 has an external frame portion 511 that is removably disposed in the neck groove 211 and that has opposite lateral ends, a plurality of latch portions 512 that protrude respectively from the two opposite lateral ends of the external frame portion 511 toward each other and that are removably disposed under the shell body portion 21, a support portion 513 that extends rearwardly and upwardly from the external frame portion 511 to a position under the press member 52, and an extending portion 514 that extends forwardly from the support portion 513 and that removably engages the positioning groove 212. The latch portions 512 are respectively and removably disposed in the two ends of the neck groove 211 which are formed in the bottom of the shell body portion 21, and each latch portion 512 has a restriction hole 515 that extends in an up-down direction (V) and that is engaged separably with a respective one of the snap-lock portions 22. The press member 52 has an external wall portion 521 that is removably coupled to the shell body portion 21 of the connector head module 2. The external wall portion 521 is located rearwardly of the external frame portion 511, and has two opposite lateral ends and a front end that abuts against rear ends of the two blocking portions 23 of the connector head module 2.

The press member 52 further has a plurality of fitting portions 522 that extend from the two opposite lateral ends of the external wall portion 521 toward each other and that are located under the shell body portion 21, and an operating portion 523 that extends forwardly and upwardly from the external wall portion 521 to a position over the support portion 513 of the support member 51. In the fiber optic connector according to the present disclosure, the restriction holes 515 are designed to align respectively with the snap-lock portions 22, the support member 51 supports the press member 52 when the press member 52 is pressed, and the extending portion 514 is designed to be engaged with the positioning groove 212, thereby allowing a fiber optic technician or user to easily locate and position the support member 51. If the technician tries to engage the support member 51 from the wrong direction, the protruding portion 514 will be blocked by the shell body portion 21 and cannot be engaged, thereby achieving a poka-yoke (foolproof) design. The press member 52 is also designed to be easier to engage with the connector head module 2 by allowing the technician to feel the engagement of these components. Specifically, the two blocking portions 23 abutting against the front end of the external wall portion 521 allows the technician to sense the positioning haptically, which simplifies installation and reduces error. When the connector head module 2 is inserted forwardly into a fiber optic socket (or a fiber optic port) (not shown), the support portion 513 is pressed downwardly before rebounding due to its own resiliency, and thereby allowing the connector head module 2 to engage the fiber optic socket. To remove the connector head module 2, the operating portion 523 may be pressed downward. Pressing downward on the operating portion 523 pushes the support portion 513 such that the support portion 513 is disengaged from the fiber optic socket and the connector head module 2 can be removed.

Figure 6:
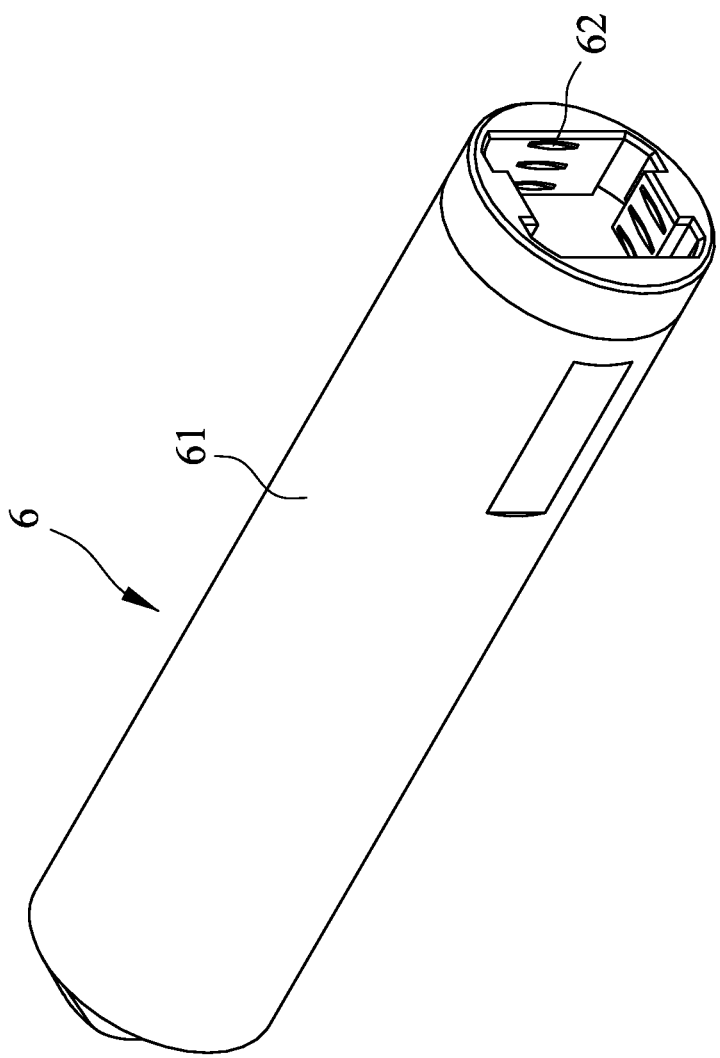
FIG. 6 is a perspective view of a sheath member of the embodiment.
Figure 7:
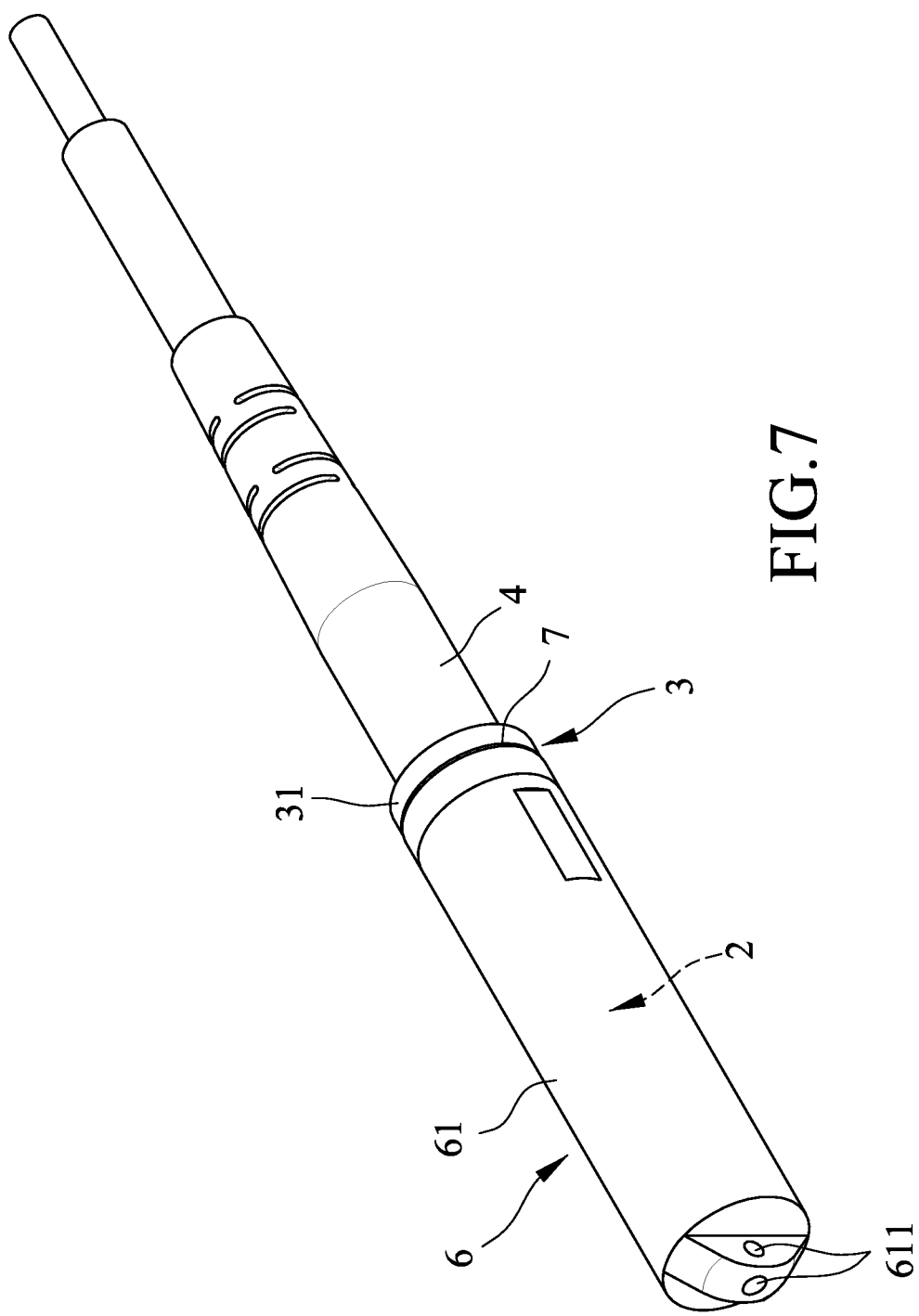
FIG. 7 is a perspective view, illustrating a configuration of the engaging module removed from the connector head module and the sheath member sleeved over the connector head module.

Referring to FIGS. 2, 6, and 7, the sheath member 6 includes a sheath portion 61, and an internal threaded portion 62 that is formed in an inner surface of the sheath member 6. The sheath portion 61 has a front end portion formed with at least one lanyard hole 611. In this embodiment, there area plurality of lanyard holes 611 as shown in FIG. 2, through which a lanyard may be passed though for the technician to carry the fiber optic connector. It should be noted that the threads of the internal threaded portion 62 in this embodiment is non-continuous, but in other embodiments, a continuous threading may be used if required. The annular seal 7 is sleeved tightly on the seat body portion 31 of the mounting seat 3, and is located rearwardly of the external threaded portion 32 in front of the rear boot 4. The technician sets-up a fiber optic network by laying a fiber optic cable between various devices and connecting these devices with a fiber optic connector of the fiber optic cable. Before the technician moves between device locations for setting up the fiber optic network, the engaging module 5 needs to be first removed from the connector head module 2. The sheath member 6 is then attached to the mounting seat 3 with the sheath portion 61 sleeved on the connector head module 2, and the internal threaded portion 62 threadedly engaged with the external threaded portion 32 of the mounting seat 3 so that the sheath member 6 covers the connector head module 2. At this time, the annular seal 7 is clamped between the sheath member 6 and the seat body portion 31, which achieves the effect of preventing dirt or moisture from entering the sheath member 6. Through the protection of the sheath member 6, damage to the connector head module 2 is avoided when the fiber optic connector is pulled. Also, because the externally protruding parts (i.e., the support member 51 and the press member 52) on the fiber optic connector have been removed, the overall outer diameter can be smaller than that of the conventional fiber optic connector even with the sheath member 6 sleeved on. Moreover, to further increase the convenience of installing the fiber optic connector, the profile of the sheath member 6 may be made in a shape that is suitable for passing through a narrow environment, such as a bullet shape. The engaging module 5 can also be designed differently according to the type of the connector head module 2. When the fiber optic connector has been carried to the desired location and is ready to be installed (plugged in) by the technician, the sheath member 6 is threadedly disengaged with the mounting seat 3 and unsleeved from the connector head module 2, and the engaging module 5 is re-coupled to the connector head module 2 so that the fiber optic connector can be connected with the fiber optic socket. This prevents the support member 51 and the press member 52 from hooking onto other random objects when the fiber optic connector is moving between device locations, thus making the fiber optic connector more portable as well as improving its durability. It should be noted herein that, although the sheath member 6 is connected to the mounting seat 3 by threaded engagement in this embodiment, the threaded configuration may be replaced by a tong-and-groove mechanism or other detachable mechanisms based on user requirements.

In summary, when the sheath portion 61 of the sheath member 6 is sleeved on the connector head module 2, the engaging module 5 is removed from the connector head module 2. As such, the overall external diameter of the fiber optic connector is smaller than the conventional fiber optic connector, thereby greatly reducing the difficulty of installing the fiber optic connector in complex or narrow environments. Furthermore, when the fiber optic connector according to the present disclosure is carried to the site of installation, the sheath member 6 being threadedly engageable with the mounting seat 3 waterproofs and dustproofs the fiber optic connector, and the removable engaging module 5 being temporarily removed from the connector head module 2 prevents damage when moving through narrow environments. Therefore, the object of the present disclosure can certainly be achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiments, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic connector comprising:
    a connector head module;
    a mounting seat mounted to a rear end of said connector head module, and including a seat body portion, and an external threaded portion that protrudes from said seat body portion;
    a rear boot connected to a rear end of said seat body portion;
    an engaging module removably coupled to said connector head module; and
    a sheath member including a sheath portion and an internal threaded portion that is formed in an inner surface of said sheath member;
    wherein, when said engaging module is removed from said connector head module, said sheath member is attachable to said mounting seat with said sheath portion being sleeved on said connector head module and with said internal threaded portion being threadedly engaged with said external threaded portion of said mounting seat;
    wherein said engaging module includes a support member that is removably engaged to said connector head module, and a press member that is removably engaged to said connector head module and that is located rearwardly of said support member, said support member having a support portion that extends rearwardly and upwardly, said press member having an operating portion that extends forwardly and upwardly to a position over said support member, said support member supporting said press member when said press member is pressed; and
    wherein said connector head module includes a shell body portion that is formed with a neck groove, said support member of said engaging module further having an external frame portion that is removably disposed in said neck groove and that has opposite lateral ends, and a plurality of latch portions that protrude respectively from said opposite lateral ends of said external frame portion toward each other and that are removably disposed under said shell body portion, said support portion extending rearwardly and upwardly from said external frame portion to a position under said press member.

2. The fiber optic connector as claimed in claim 1, wherein said connector head module further includes two snap-lock portions that protrude downwardly from a bottom of said shell body portion, that are spaced apart in a left-right direction, and that are disposed in said neck groove, each latch portion of said support member having a restriction hole that extends in an up-down direction and that is engaged separably with a respective one of said snap-lock portions.

3. The fiber optic connector as claimed in claim 1, wherein said shell body portion of said connector head module is further formed with a positioning groove that is adjacent to said neck groove and that is located in front of said neck groove, said support member of said engaging module further having an extending portion that extends forwardly from said support portion and that removably engages said positioning groove.

4. The fiber optic connector as claimed in claim 1, wherein said press member of said engaging module further has an external wall portion that is removably coupled to said shell body portion of said connector head module, that is located rearwardly of said external frame portion, and that has two opposite lateral ends, and a plurality of fitting portions that extend from said two opposite lateral ends of said external wall portion towards each other and that are located under said shell body portion, said operating portion extending forwardly and upwardly from said external wall portion to a position over said support portion.

5. The fiber optic connector as claimed in claim 4, wherein said connector head module further includes two blocking portions that respectively protrude from opposite lateral sides of said shell body portion and that abut against a front end of said external wall portion.

6. The fiber optic connector as claimed in claim 1, further comprising an annular seal that is sleeved on said seat body portion of said mounting seat and that is located rearwardly of said external threaded portion, said annular seal being clamped between said sheath member and said seat body portion when said engaging module is removed from said connector head module and when said internal threaded portion of said sheath member is threadedly engaged with said external threaded portion of said mounting seat.

7. The fiber optic connector as claimed in claim 1, wherein said sheath portion of said sheath member has a front end portion formed with at least one lanyard hole.

* * * * *